United States Patent [19]

Parks et al.

[11] Patent Number: 4,877,845

[45] Date of Patent: Oct. 31, 1989

[54] CURE ACTIVATORS FOR NONHALOGENATED RUBBERS

[75] Inventors: Carl R. Parks, Akron; Donald J. Burlett, Wadsworth, both of Ohio

[73] Assignee: The Goodyear Tire & Rubber Company, Akron, Ohio

[21] Appl. No.: 296,634

[22] Filed: Jan. 13, 1989

Related U.S. Application Data

[62] Division of Ser. No. 129,200, Dec. 7, 1987, Pat. No. 4,839,433.

[51] Int. Cl.$^4$ .............................................. C08C 19/20
[52] U.S. Cl. ...................................... 525/346; 525/348
[58] Field of Search ................ 525/346, 348, 370, 379

[56] References Cited

U.S. PATENT DOCUMENTS

| | | | |
|---|---|---|---|
| 2,582,795 | 1/1952 | Prentiss et al. | 525/346 |
| 2,813,566 | 11/1957 | Ruggeri | 525/346 |
| 2,889,307 | 6/1959 | Clayton | 525/346 |
| 2,964,493 | 12/1960 | Hakala | 525/346 |

OTHER PUBLICATIONS

Cowan, J R, et al, "Atmospheric Heat Aging of Carboxyl-Terminated Polybutadiene", (1976), J. Polymer Sci.: Symposium No. 55, pp. 17–24.

*Primary Examiner*—Christopher Henderson
*Attorney, Agent, or Firm*—Bruce J. Hendricks

[57] ABSTRACT

There is disclosed compounds of the structural formula:

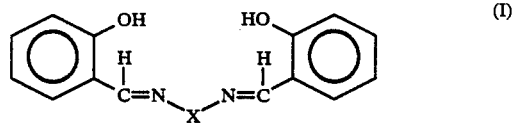

or

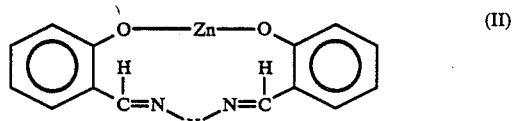

wherein X is a radical of the structural formula:

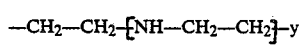

and y is 0,1,2 or 3; which when combined with a nonhalogenated vulcanizable diene containing elastomer such as polybutadiene, polyisoprene, styrene/butadiene copolymers, terpolymers of acrylonitrile butadiene and styrene and blends thereof accelerate the rate of vulcanization without detrimentally impacting the processing safety of the rubber. These compounds either in free form structural formula (I) or as preformed complexes with zinc structural formula (II) in the plus 2 valence state offer significantly enhanced rates of cure and excellent final physical properties without a significant loss of processing safety. The preformed nonhalogenated zinc complexes (II) may be added to sulfur vulcanizable rubbers at levels that maintain typical levels of zinc in the rubber compound.

7 Claims, No Drawings

CURE ACTIVATORS FOR NONHALOGENATED RUBBERS

This is a division of application Ser. No. 129,200, filed on Dec. 7, 1987, now U.S. Pat. No. 4,839,433.

TECHNICAL FIELD

This invention is concerned with the enhancement of rates of cure or vulcanization of sulfur vulcanizable elastomers without detrimentrally reducing the processing safety of the elastomer.

BACKGROUND ART

The primary achievement of the instant invention resides in the discovery that certain specific salicylimines either in free form or complexed with zinc in the plus 2 valence state will dramatically increase the rate of cure of certain elastomers while simultaneously providing adequate processing safety. In the manufacture of vulcanized rubber articles, significant cost savings can be realized through a reduction of time the article is required to spend in the mold. Through enhanced rates of vulcanization, the in mold time required to meet minimum cure levels (physical properties) can be reduced; however, processing safety (or scorch) of the stock must be maintained.

Vulcanization, or curing, is a term applied to the process where elastomers, natural and synthetic, are treated with certain chemicals to improve their strength and durability. In general, vulcanization will effect the following changes in raw elastomers: increase tensile strength, eliminate tackiness, decrease solubility in various solvents, increase elasticity and decrease temperature sensitivity. These improved properties can be obtained by treating the raw elastomer with sulfur in the presence of other chemicals such as accelerators. It is known that the presence of accelerators in the vulcanization process is desirable since accelerators enable the vulcanization reaction to be carried out in a shorter period of time and at a lower temperature.

If large amounts of accelerators are used in the vulcanization process, the resulting composition contains appreciable amounts of the accelerator or decomposition products thereof. Although the presence of appreciable amounts of accelerators in the final composition is not detrimental, there are applications where the presence of the accelerator is undesirable, for example, accelerators such as the thiazoles, are skin irritants. Thus, consideration of the amount and type of accelerator present in the vulcanized composition is important where the vulcanized composition is to be used in the preparation of fabrics and articles which may come in contact with the skin.

Vulcanization accelerators presently used in the industry also present other problems. For example, dithioacid salts such as dithiocarbamates or thiurams, so called "ultra accelerators", rapidly accelerate vulcanization at conventional vulcanization temperatures but have the problem of prematurely vulcanizing the rubber compositions during processing steps and as mixing or molding due to the heat generated by the mixing which results in the undesired scorching of the rubber. Sulfenamides, so called "delayed action accelerators", do not possess scorching problems, but they tend to retard the rate of vulcanization.

Accordingly, it has become important in the rubber industry to find novel accelerator systems that prevent scorching of the rubber at processing temperatures, but that allow vulcanization to take place rapidly at vulcanization temperatures and to provide final compositions which do not have accelerators bloom, or come to the surface, of the rubber article.

U.S. Pat. No. 2,615,860 is concerned with the protection of synthetic resin compositions from degradation caused by light, especially ultraviolet radiation. This patent discloses the use of metal chelates as stabilizers. Specifically, this patent is concerned with a solid polymer of ethylene and not more than 10% by weight of a metal chelate compound, wherein the metal chelate compound is a nickel derivative of the Schiff's base derived fromm ethylenediamine and salicylaldehyde.

Chemical Abstract 77 (22): 141163g discloses that several Russian investigators have determined that compounds such as N,N'-disalicylideneethylenediamine chelates of certain metals are vulcanizing agents for chloro butyl rubbers. The abstract discloses that the degree of crosslinking was evaluated by swelling, and that vulcanization by the chelates without zinc oxide imparted enhanced tensile strength to the rubber. This reference does not suggest or disclose the instant invention which is concerned with the use of certain specific chelates of zinc in certain sulfur vulcanizable rubbers as cure rate enhancers.

U.S. Pat. No. 4,139,523 discloses a polyphosphazene composition stabilized against thermal aging comprising (1) a polyphosphazene represented by the general formula:

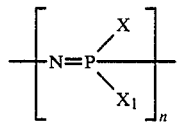

and wherein n represents an integer from 20 up to about 50,000 and X and $X_1$ each represent a monovalent radical selected from the group consisting of alkoxy, aryloxy and amino; and (2) a stabilizer consisting of an organic compound compatible with said polyphosphazene and present in an amount sufficient to stabilize said polyphosphazene against thermal degradation, said organic compound represented by the structure:

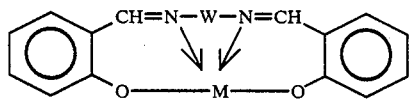

wherein W is —CRR'—CRR'—, or:

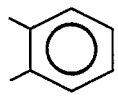

and wherein R and R' are selected from the group consisting of hydrogen, alkyl, cycloalkyl, aryl or mixtures thereof, and M is zinc or magnesium.

DISCLOSURE OF THE INVENTION

There is disclosed a sulfur vulcanizable rubber composition comprising a nonhalogenated sulfur vulcanizable rubber, a vulcanizing agent, accelerator and a cure activator, wherein said cure activator has the structural formula:

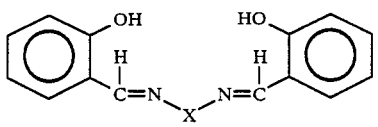

or

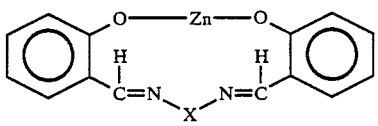

wherein X is a radical of the structural formula:

wherein y is 0, 1, 2 or 3.

There is also disclosed a method for enhancing the rate of sulfur vulcanization of a sulfur vulcanizable elastomer or blend of elastomers which comprises adding to said elastomer a compound or compounds of the structural formula:

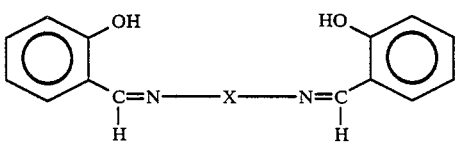

and/or

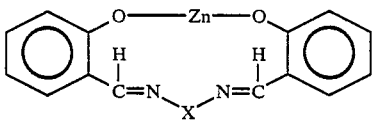

wherein X is a radical of the structural formula:

wherein y can equal 0, 1, 2, or 3.

These compounds either in free form (structural formula I) or as preformed complexes with zinc (structural formula II) offer significantly enhanced rates of cure and excellent final physical properties of the vulcanizate without a significant loss of processing safety. These compounds may be added to the sulfur vulcanizable rubbers as preformed complexes at levels that provide typical levels of zinc to the rubber compound.

The term "rubber" or "elastomer" as used herein embraces both natural rubber and all its various raw and reclaim forms as well as various synthetic rubbers, i.e., rubber polymers of the type which may be vulcanized with sulfur while specifically excluding the halogenated rubbers such as chloroprene or neoprene. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylenes, e.g. vinyl acetylene; olefins, for example, isobutylene, which copolymerizes with isoprene to form butyl rubber; vinyl compounds, for example, vinylchloride, arcylic acid, acrylonitrile (which polymerizes with butadiene to form buna-N rubber), methacrylic acid and styrene, the latter compound polymerizing with butadiene to form Buna-S rubber, as well as vinyl esters and various unsaturated aldehydes, ketones and ethers, e.g. acrolein, methylisopropyl ketone and vinylethyl ether. Also included are the variou synthetic rubbers prepared from the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers which have been developed in recent years, such as EPDM. Such recently developed rubbers include those that have polymer bound functionality such as antioxidants and antiozonants. These polymer bound materials are known in the art and can have functionalities that provide antidegradative properties, synergism, and other properties. Polymer bound functions have great value since the pendant functionality possessing the desired activity cannot be extracted (or migrate) since it is chemically attached to the backbone of the polymer.

The preferred rubbers used with the instant invention are styrene/butadiene copolymers, polybutadiene and polyisoprene.

The cure activators of this invention can be used with any conventional compounding additives such as carbon black, zinc oxide, antidegradants and stearic acid. For the purposes of this invention, "sulfur vulcanizing agent" means elemental sulfur or sulfur donating vulcanizing agents, for exammple, an amine disulfide or a polymeric polysulfide. Preferably, the activators of this invention are used with free sulfur. The invention is applicable to various classes and conventional amounts of vulcanization agents.

The accelerators that can be used in conjunction with the compounds of this invention are those that are known and typically used in the sulfur vulcanization of rubbers.

The following examples illustrate the preparation and use of various vulcanization accelerators of the present invention and are not intended to limit the scope of the present invention. All parts are by weight unless otherwise noted.

Best Mode

EXAMPLE 1

Preparation of a Compound of Structural Formula I when y=0

In a 500 ml round bottom flask was placed 9.84 g of ethylene diamine dissolved in 100 ml of ethanol. To this solution was added 40.0 g of salicylaldehyde dissolved in 100 ml of ethanol. The mixture was stirred at reflux for 2 hours after which the reaction mixture was cooled and the yellow crystalline product was collected by filtration and washed with cold ethanol. After drying 43 g of salen was obtained.

To prepare compounds of structural formula I when y is 1, 2 or 3, the above procedure would be used except that the ethylene diamine would be replaced with compounds such as diethylene triamine, triethylene tetramine and tetraethylene pentamine.

EXAMPLE 2

Preparation of a Compound of Structural Formula II when y=0

[[α,α-(Ethylenedinitrilo)di-o-cresolato](2-)]-Zinc

Sodium hydroxide (8 g) was dissolved in 250 ml of water and placed in a 3 neck 1 liter flask with 26.8 g of Salen (Salicyaldehyde-ethylenediamine Schiff base compound prepared in Example 1). The mixture was heated to 45° C. with stirring and then 28.7 g of $ZnSO_4$ dissolved in 200 ml of water was added dropwise over about ½ hour. After the reaction mixture had stirred overnight at room temperature, the product was collected by filtration, washed with water and dried over $P_2O_5$ under vacuum. Product yield was approximately 100%. IR 1630 cm$^{-1}$ (C=N); no O—H peak.

For compounds of structural formula II wherein y=1, 2, or 3, a compound of structural formula I is obtained as described in Example 1 when y=1, 2, or 3 and then reacted as described in this example to yield the zinc complex.

EXAMPLE 3

Compounding in Natural Rubber

Compounds of this invention and several comparatives were milled into a productive masterbatch. The nonproductive masterbatch had the following composition:

TABLE I

| Component | Amount (phr) |
|---|---|
| Natural rubber | 100 |
| Processing oil | 3.0 |
| Wax | 1.0 |
| Antiozonant | 2.0 |
| Antioxidant | 1.0 |
| Carbon black | 50.0 |

This nonproductive masterbatch was mixed on a Banbury for about 5 minutes and then transferred to a mill for incorporation of the productive ingredients listed in Table II.

TABLE II

| Component | Amount (phr) |
|---|---|
| Stearic acid | 1.0 |
| Zn complex | Variable |
| Sulfur | 1.8 |
| Primary accelerator | 0.8 |
| Secondary accelerator | 0.15 |

The compounds were mill mixed for about 3 minutes and then sheeted and samples of the compound placed in a Monsanto Model MPV rheometer and a Scott Mooney Viscometer.

Table III sets out by structural formula the zinc complex evaluated, the amount of complex added to achieve approximate equal levels of zinc, the time to achieve 25% of the ultimate modulus observed for the compound on the rheometer—t25, the time required to achieve 90% of the ultimate modulus observed for the compound on the rheometer—t90, the total torque developed on rheometer (final torque minus initial torque)—Δ torque and the time in minutes to a five point rise in the Mooney viscosity of the compound at 120° C. as determined on the Scott Mooney Viscometer—scorch.

TABLE III

| Sample No. | Zn Complex | Amt Complex (phr) | t25 | t90 | Δ Torque | Scorch |
|---|---|---|---|---|---|---|
| 1 | ZnO (Control) | 1.3 | 4.5 | 6.4 | 25.4 | 14.7 |
| 2 | 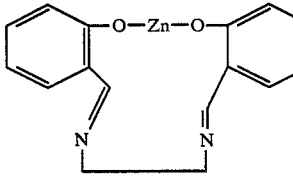 | 5.3 | 2.7 | 4.0 | 23.6 | 10.1 |
| 3 | 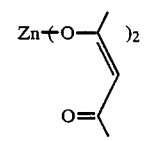 | 4.0 | 2.2 | 3.3 | 4.6 | 18.8 |
| 4 | 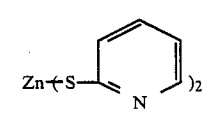 | 4.6 | 1.3 | 1.9 | 20.1 | 3.0 |
| 5 | 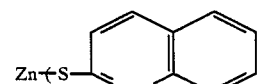 | 9.2 | 1.2 | 2.0 | 23.8 | 2.2 |

TABLE III-continued

| Sample No. | Zn Complex | Amt Complex (phr) | t25 | t90 | Δ Torque | Scorch |
|---|---|---|---|---|---|---|
| 6 | $Zn{-}[{-}S{-}P(=S)({-}O{-}CH(CH_3)_2)_2]_2$ | 7.8 | 1.5 | 2.5 | 14.9 | 3.3 |
| 7 | $Zn{-}[{-}S{-}C(={N{-}NH{-}C_6H_5})({-}N=N{-}C_6H_5)]_2$ | 9.2 | 3.5 | 10.0 | 18.8 | 12.0 |
| 8 | $Zn{-}[{-}O{-}C(=O){-}C_6H_4{-}NH_2]_2$ (anthranilate) | 5.4 | 4.3 | 5.5 | 8.2 | 17.9 |
| 9 | $Zn{-}[{-}O{-}(8\text{-quinolinyl})]_2$ | 6.2 | 4.7 | 6.3 | 17.0 | 17.5 |

The data contained in Table III demonstrates that only Sample 2 (compound of this invention) provided for an enhanced rate of cure, without significant decrease in scorch time and maintained the state of cure as indicated by Δ torque.

EXAMPLE 4

Compounding in an SBR/Polybutadiene Blend

Compounds of this invention and comparatives were milled into a productive masterbatch. The nonproductive masterbatch had the following composition:

TABLE IV

| Component | Amount (phr) |
|---|---|
| SBR (Cold recipe-23% styrene | 70.0 |
| Polybutadiene | 30.0 |
| Wax | 3.0 |
| Antiozonant | 2.0 |
| Carbon black | 65.0 |
| Oil | 33.75 |

This nonproductive masterbatch was mixed on a Banbury for about 5 minutes and then transferred to a mill for incorporation of the productive ingredients listed in Table V.

TABLE V

| Component | Amount (phr) |
|---|---|
| Sulfur | 1.6 |
| Antioxidant | 1.0 |
| Primary accelerator | 1.0 |
| Secondary accelerator | 0.2 |
| Zinc complex | Variable |

The compounds were mill mixed for about 3 minutes and sheeted and test samples of the compound were placed in the rheometer.

Table VI sets out zinc complexes and the test results.

TABLE VI

| Sample No. | | Actual "Zn" phr | t25 | t90 | Δ Torque | Scorch |
|---|---|---|---|---|---|---|
| 10 | Control No. 1; ZnO, 3 phr | 2.4 | 6.8 | 13.8 | 21.2 | 22.4 |
| 11 | Control No. 2; ZnO, 1 phr | 0.8 | 7.4 | 13.4 | 20.0 | 23.5 |

TABLE VI-continued
| Sample No. | Structure | Actual "Zn" phr | t25 | t90 | Δ Torque | Scorch |
|---|---|---|---|---|---|---|
| 12 | 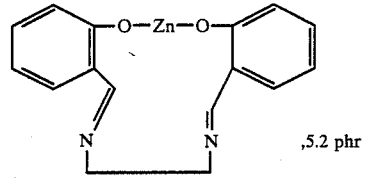, 5.2 phr | 1.0 | 5.0 | 7.2 | 20.5 | 18.1 |
| 13 | 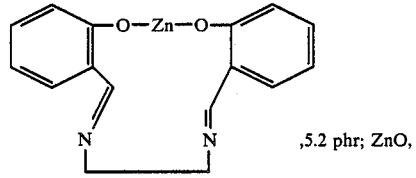, 5.2 phr; ZnO, 1 phr | 1.8 | 5.8 | 9.6 | 24.1 | 22.0 |
| 14 | 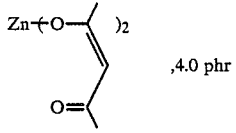, 4.0 phr | 1.0 | 4.6 | 13.4 | 14.3 | 8.0 |
| 15 | 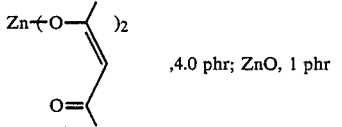, 4.0 phr; ZnO, 1 phr | 1.8 | 4.9 | 16.7 | 15.8 | 8.2 |
| 16 | 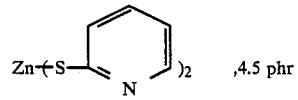, 4.5 phr | 1.0 | 1.3 | 2.3 | 16.6 | 2.4 |
| 17 | 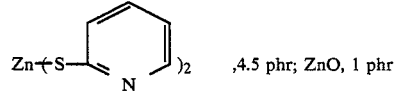, 4.5 phr; ZnO, 1 phr | 1.8 | 1.7 | 3.3 | 22.1 | 3.0 |
| 18 | 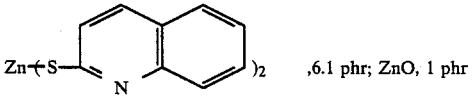, 6.1 phr; ZnO, 1 phr | 1.8 | 2.3 | 5.8 | 23.1 | 3.5 |
| 19 | 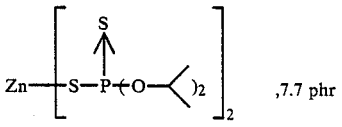, 7.7 phr | 1.0 | 3.0 | 12.1 | 19.9 | 5.4 |
| 20 | 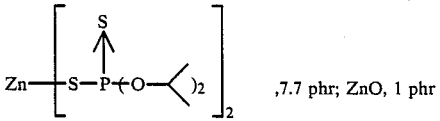, 7.7 phr; ZnO, 1 phr | 1.8 | 4.2 | 12.9 | 25.6 | 6.4 |

TABLE VI-continued

| Sample No. | | Actual "Zn" phr | t25 | t90 | Δ Torque | Scorch |
|---|---|---|---|---|---|---|
| 21 | [structure: Zn—S—C(=N-NH-Ph)(N=N-Ph)]₂, .9.2 phr | 1.0 | 4.9 | 9.2 | 17.2 | 16.6 |

Table VI demonstrates that the compound of structural formula II enhance rates of vulcanization without significantly reducing scorch. Table VI also shows that a balance between the complexing agent and free ZnO will result in improved rates of cure without a reduction of scorch.

EXAMPLE 5

Compounding of Structural Formula I in Rubber

The masterbatch set out in Tables I and II was used to evaluate the uncomplexed compounds in these rubber formulations. As in Examples 3 and 4, a non-productive mix was followed by the productive mix. The productive mix recipe of Tables II and V were used except that 3.0 phr of ZnO was used in the sample and the zinc complex was replaced with a variable amount of the complexing agent.

As in previous examples, the samples were sheeted and evaluated on a rheometer. Table VII sets out the results. Values are expressed in terms of percent reduction to t90 and percent reduction of scorch. These values were calculated based on a control which contained only 3.0 phr ZnO and 0.0 phr of a complexing agent.

TABLE VII

| Sample No. | Amount (phr) | % t90 Reduction SBR/BR | % t90 Reduction NR | % Scorch Reduction SBR/BR | % Scorch Reduction NR |
|---|---|---|---|---|---|
| 22 Salen* | .74 | 15.7 | 9.5 | 4.3 | 13.5 |
| 23 Saldiene** | .74 | 25.0 | 17.5 | 11.1 | 21.5 |
| 24 Saltrien*** | .74 | 28.0 | 17.5 | 10.7 | 26.0 |
| 25 Saltetren+ | .74 | 32.6 | 9.5 | 13.8 | 13.5 |
| 26 Salpenten++ | .74 | 37.9 | 23.8 | 25.0 | 40.0 |
| (Comparative) | | | | | |
| 27 X = (CH₂)₃ | .74 | 13.6 | 14.7 | 11.5 | 4.5 |
| (Comparative) | | | | | |
| 28 X = (CH₂)₆ | .74 | 15.7 | 16.2 | 9.6 | 12.6 |
| (Comparative) | | | | | |
| 29 Para+++ | .74 | 19.8 | 15.9 | 14.1 | 22.0 |
| (Comparative) | | | | | |

*Structural formula I when y = 0.
**Structural formula I when y = 1.
***Structural formula I when y = 2.
+Structural formula I when y = 3.
++Structural formula I when y = 4.
+++Compound of structural formula I where y = 0 and the —OH group is para to benzylidene group.

The information contained in Table VII shows that the compounds of this invention (Sample Nos. 22-26) provide enhanced rates of cure while only moderately decreasing scorch protection. In comparison, the comparative (Sample Nos. 27-29) do not demonstrate the same level of beneficial properties.

EXAMPLE 6

Varying Levels in SBR/BR

In an effort to optimize the level of compounds of structural formula I in an SBR/polybutadiene rubber blend, the following experiment was conducted. To the masterbatch of Table IV and the productive recipe of Table V was added varying levels of Salen and 3.0 phr of ZnO. Table VIII sets out the results.

TABLE VIII

| Sample No | Amount Salen (phr) | % Cure Time Reduction | % Mooney Scorch Time Reduction |
|---|---|---|---|
| 30 | 0.0 | — | — |
| 31 | .37 | 3.0 | 1.5 |
| 32 | .74 | 14.7 | 4.8 |
| 33 | 1.50 | 23.5 | 10.6 |
| 34 | 2.94 | 33.8 | 16.3 |
| 35 | 5.88 | 42.6 | 22.1 |
| 36 | 10.0 | 52.9 | 34.6 |
| 37 | 11.8 | 57.4 | 42.3 |

The data evidences that as the level of the Salen is increased the percent cure time reduction also increases. However, the percent of Mooney scorch time reduction also increases. It was noted that Δ torque decreases at very high levels of Salen.

EXAMPLE 7

Effect of Replacing ZnO With Zn Salen

Using the masterbatch and productive recipe of Tables IV and V, the effect of replacing ZnO with Zn Salen was investigated. Table IX sets out the results.

TABLE IX

| Sample No. | Amount Zn Salen (phr) | Amount ZnO (phr) | % Cure Time Reduction | % Mooney Scorch Time Reduction |
|---|---|---|---|---|
| 38 | 0.0 | 3.0 | — | — |
| 39 | .46 | 2.89 | 11.7 | + |
| 40 | .91 | 2.78 | 14.1 | + |
| 41 | 1.81 | 2.55 | 24.2 | + |
| 42 | 3.64 | 2.11 | 28.1 | + |
| 43 | 7.27 | 1.51 | 21.9 | + |
| 44 | 12.31 | 0.0 | 34.4 | + |

+Indicates that scorch time was equal to or longer than the control (without Salen #38)

Table IX demonstrates that levels of Zn Salen may be increased to result in increased percent of cure time reduction, however, scorch time was not significantly decreased.

In an attempt to evaluate the teachings of CA 77(22): 141163 g, discussed in Background Art, the following examples was conducted:

EXAMPLE 8

Use in Chlorobutyl Rubber 100 parts of chlorobutyl rubber, 13 parts of oil and 60 parts of carbon black were mixed in a Banbury for about 5 minutes and then various combinations of curative packages were mixed into the chlorobutyl stock on a Banbury for about 3 minutes. As previously described, the stocks were evaluated. Table X sets out the results.

TABLE X

| Component | Sample No. 45 | Sample No. 46 | Sample No. 47 | Sample No. 48 | Sample No. 49 | Sample No. 50 | Sample No. 51 |
|---|---|---|---|---|---|---|---|
| ZnO | 5.0 | 5.0 | 4.0 | 3.0 | 3.0 | 2.0 | 0 |
| Sulfur | 0 | 0 | 0 | 0.5 | 0.5 | 0.5 | 0.5 |
| Accelerator | 0 | 0 | 0 | 1.5 | 1.5 | 1.5 | 1.5 |
| Salen | 0 | 1.5 | 0 | 0 | 3.0 | 0 | 3.0 |
| Zn Salen | 0 | 0 | 1.8 | 0 | 0 | 2.0 | 0 |
| Test | | | | | | | |
| t 25 min | 12.6 | 12.5 | 13.0 | 10.2 | 22.6 | 14.5 | 42.7 |
| t 90 min | 56.0 | 124.0 | 117.0 | 30.0 | 89.5 | 57.5 | 159.5 |
| Δ torque d N · m | 13.3 | 11.0 | 12.0 | 12.0 | 11.7 | 13.3 | 8.8 |
| Scorch | 93 | 120 | 115 | 24.7 | 76.4 | 36.0 | 146.5 |

The data discloses that the use of Salen or Zn Salen in chlorobutyl rubber provided no reduction in cure time. As cure time increased, so did scorch, thus, the use of the compounds of structural formula I and structural formula II in halogenated rubbers would not be beneficial and is outside the scope of this invention.

The Russian investigator made no comment on cure rate reduction, but it appears from this example that cure rate reduction is not realized when using Salen or Zn Salen in chlorobutyl rubber. Thus, the teachings of the Russian reference in combination with this example would lead one away from the instant invention.

EXAMPLE 9

Use of Salen and Zn Salen in Various Rubbers

The following compounding series were run with the results listed in Table XI.

TABLE XI

| | Sample No. 52 | Sample No. 53 | Sample No. 54 | Sample No. 55 | Sample No. 56 | Sample No. 57 | Sample No. 58 | Sample No. 59 | Sample No. 60 |
|---|---|---|---|---|---|---|---|---|---|
| NON-PRODUCTIVE | | | | | | | | | |
| SBR-A* | — | 100 | 100 | 100 | — | — | — | — | — |
| SBR-B* | — | — | — | 100 | 100 | 100 | — | — | — |
| PBd* | — | — | — | 100 | — | — | 100 | 100 | 100 |
| Wax | 1 | 1 | 1 | 1 | 1 | 1 | 1 | 1 | 1 |
| Antiozonant | 2 | 2 | 2 | 2 | 2 | 2 | 2 | 2 | 2 |
| Carbon black | 45 | 45 | 45 | 45 | 45 | 45 | 45 | 45 | 45 |
| PRODUCTIVE | | | | | | | | | |
| ZnO | 3 | 3 | 2 | 3 | 3 | 2 | 3 | 3 | 2 |
| Stearic acid | 2 | 2 | — | 2 | 2 | — | 2 | 2 | — |
| Sulfur | 1.6 | 1.6 | 1.6 | 1.6 | 1.6 | 1.6 | 1.6 | 1.6 | 1.6 |
| Primary Accelerator | 1 | 1 | 1 | 1 | 1 | 1 | 1 | 1 | 1 |
| 2nd day ACC | 0.2 | 0.2 | 0.2 | 0.2 | 0.2 | 0.2 | 0.2 | 0.2 | 0.2 |
| Antiozonant | 1 | 1 | 1 | 1 | 1 | 1 | 1 | 1 | 1 |
| Salen | — | 3 | — | — | 3 | — | — | 3 | — |
| Zn Salen | — | — | 3.5 | — | — | 3.5 | — | — | 3.5 |
| SCORCH | | | | | | | | | |
| Mins | 22.5 | 20.2 | 22.3 | 20.4 | 18.7 | 22.5 | 19.3 | 16.8 | 18.7 |
| Δ Torque | 15.4 | 16.6 | 17.1 | 15.4 | 16.7 | 16.4 | 21.1 | 22.8 | 22.4 |
| t 25, min | 7.3 | 5.6 | 6.6 | 6.3 | 5.6 | 6.8 | 7.1 | 5.7 | 6.2 |
| t 90, min | 16.5 | 10.2 | 11.6 | 15.2 | 9.8 | 11.7 | 10.4 | 7.8 | 7.8 |
| CHANGE IN SCORCH | | | | | | | | | |
| +/−% | | −10.0 | −1.0 | | −8.3 | +10.3 | | −13.0 | −3.1 |
| CHANGE IN CURE | | | | | | | | | |
| +/−% | | −38.2 | −29.7 | | −35.5 | −23.0 | | −25.0 | −25.0 |

*SBR-A - 23.5% styrene SBR
*SBR-B - 36.0% styrene SBR
*PBd - polybutadiene

The data demonstrate that Salen and Zn Salen work in both SBR and PBd to increase the cure rate with modest (or no) decreases in scorch time. Further, Zn Salen continues to perform better than its uncomplexed version and there is only a minor difference in the performance with increased styrene content in SBR's.

EXAMPLE 10

In an effort to demonstrate the effectiveness of the compounds of this invention with other accelerator systems, the following experiment was conducted.

The control non-productive masterbatch had the following composition:

TABLE XII

| Component | Amount (phr) |
|---|---|
| SBR | 75.0 |
| Polyisoprene | 25.0 |
| Processing Oil | 28.0 |
| Carbon Black | 60.0 |
| Antiozonant | 2.0 |
| Antioxidant | 1.0 |
| Wax | 1.0 |
| Stearic Acid | 3.0 |
| ZnO | 3.0 |

An experimental non-productive masterbatch had a similar composition, except that the level of ZnO was reduced to 2.0 phr.

Four different accelerators were added to a series of control non-productive batches and in like fashion the four accelerators were added to a series of experimental non-productive masterbatches which also included 3.5 phr zinc salen per sample.

1.5 phr sulfur and 1.0 phr accelerator were in each sample. Thus, Table XIII sets out sample number, type of accelerator, Zn scourse, t90, and scorch for each sample.

TABLE XIII

| Sample No | Accelerator | Zn Source | t90 (min) | Scorch (min) |
|---|---|---|---|---|
| 61 | A | ZnO | 27.1 | 24.2 |
| 62 | A | ZnO + Zn Salen | 18.8 | 28.5 |
| 63 | B | ZnO | 25.7 | 44.5 |
| 64 | B | ZnO + Zn Salen | 20.7 | 40.8 |
| 65 | C | ZnO | 37.1 | 53.5 |
| 66 | C | ZnO + Zn Salen | 30.5 | 68.6 |
| 67 | D | ZnO | 41.7 | 65.5 |
| 68 | D | ZnO + Zn Salen | 35.5 | 61.0 |

A is N—cyclohexyl-2-mercapto-benzothiazole sulfenamide
B is N—morpholino-2-benzothiazole sulfenamide
C is N,N—diisopropyl-2-benzothiazole sulfenamide
D is N,N—dicyclohexyl-1-benzothiazole sulfenamide This invention confirms that the samples of this invention are useful with other accelerators and still evidence beneficial properties.

Industrial Applicability

The instant invention provides enhanced rate of vulcanization which, in the production of tires, hoses and belts can have a positive impact on the production rates and energy expenditures. The cure activators of this invention do not adversely affect rubber/wire adhesion or final physical properties of the vulcanizate. Other benefits derived from the use of the materials of this invention will be obvious to those skilled in the art.

We claim:

1. A method for enhancing the rate of sulfur vulcanization of a sulfur vulcanizable elastomer or blend of elastomer selected from the group consisting of natural rubber polybutadiene, polyisoprene, styrene/butadiene copolymers, terpolymers of acrylonitrile butadiene and styrene and blends thereof which comprises adding to said elastomer a compound or compounds of the structural formula:

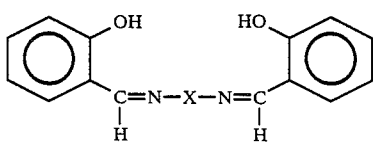

and/or

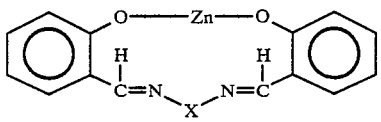 (II)

wherein X is a radical of the structural formula:

$-CH_2-CH_2-[NH-CH_2-CH_2]_y$ wherein y can equal 0, 1, 2, or 3.

2. A method according to claim 1 wherein y is 0.

3. The compound of claim 1 wherein said compound is of the structural formula:

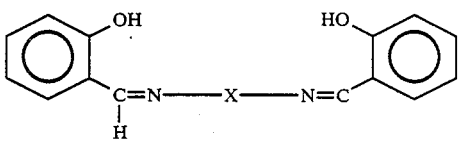

wherein X is a radical of the structural formula:

$-CH_2-CH_2-[NH-CH_2-CH_2]_y$ wherein y can equal 0, 1, 2, or 3.

4. The method of claim 1 wherein said compound is of the structural formula:

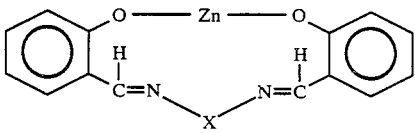

wherein X is a radical of the structural formula:

$-CH_2-CH_2-[NH-CH_2-CH_2]_y$ wherein y can equal 0, 1, 2, or 3.

5. The method of claim 3 wherein y is 0.
6. The method of claim 4 wherein y is 0.
7. The method of claim 6 wherein said elastomer is natural rubber.

* * * * *